US006112794A

United States Patent [19]

Hannon et al.

[11] Patent Number: 6,112,794

[45] Date of Patent: Sep. 5, 2000

[54] EDGEBANDING PROCESS AND APPARATUS

[75] Inventors: John L. Hannon, Amherst; Jeffrey A. Tucker, Niagara Falls, both of N.Y.

[73] Assignee: E. I. du Pont de Nemours and Company, Wilmington, Del.

[21] Appl. No.: 09/138,079

[22] Filed: Aug. 21, 1998

Related U.S. Application Data

[60] Provisional application No. 60/056,653, Aug. 22, 1997.

[51] Int. Cl.[7] .............................. B32B 31/12; B29C 47/30

[52] U.S. Cl. .......................... 156/500; 156/547; 156/548; 156/578; 156/244.27; 156/322; 425/113; 425/382 R; 425/464; 239/562; 239/581.1

[58] Field of Search .......................... 156/244.11, 244.27, 156/322, 497, 500, 539, 547, 548, 578; 239/562, 566, 581.1; 425/97, 113, 114, 382 R, 382.4, 464, 467

[56] References Cited

U.S. PATENT DOCUMENTS

| | | | |
|---|---|---|---|
| 4,600,124 | 7/1986 | Price | 222/54 |
| 5,370,319 | 12/1994 | Schlegel | 239/562 |
| 5,484,847 | 1/1996 | Prejean | 525/102 |
| 5,535,920 | 7/1996 | Blair, Jr. et al. | 222/1 |
| 5,536,805 | 7/1996 | Kangas | 528/59 |
| 5,700,322 | 12/1997 | Fort | 239/562 |

FOREIGN PATENT DOCUMENTS

| | | |
|---|---|---|
| 1-98680 | 4/1989 | Japan . |
| 4-114766 | 4/1992 | Japan . |
| 96090510 | 4/1996 | Japan . |
| 53-67867 | 11/1996 | Japan . |
| 96337759 | 12/1996 | Japan . |

OTHER PUBLICATIONS

Sales publication, Holz–Her Special Machines, Edgebanders Sprint, Date Unknown.

Sales publication, Holz–Her Special Machines, Edge Banders Accord, Date Unknown.

*Primary Examiner*—Michael W. Ball
*Assistant Examiner*—Michael A Tolin

[57] ABSTRACT

This invention relates to a process for applying an edgeband to a planar edge and an apparatus for performing the process. In the process, one or more gluing edge(s) of the structure and/or edgeband is/are heated to a temperature of greater than 25° C., a heated reactive adhesive is then applied to the gluing edge(s), the structure and edgeband are then brought together to form a composite structure, with the reactive adhesive forming the bond. In the apparatus, the reactive adhesive is provided from a sealed adhesive system.

6 Claims, 4 Drawing Sheets

EDGEBANDING PROCESS AND APPARATUS

This application claims the benefit of U.S. Provisional Application No. 60/056,653, filed Aug. 22, 1997.

BACKGROUND OF THE INVENTION

1. Field of the Invention

This invention is related to a process for applying an edgeband to a planar edge of a structure.

2. Description of the Related Art

Edgebanding is a process whereby a strip of material, or edgeband, is applied to cover the side edge of a flat panel. This can be done to cover exposed laminations, to create a more substantial panel appearance by attaching a thick edge, or to decorate the edge with a more finished or contrasting appearance. The edgebands can be of a variety of materials including wood, polyvinyl chloride (PVC), acrylic, laminates, etc.

It has been known to use hot melt adhesives in automated edgebanding for a significant decrease in fabrication time. By "hot melt adhesive" is meant an adhesive that is applied in the molten state and forms a bond upon cooling to a solid state. Such adhesives are characterized in that they can be melted and remelted numerous times. These adhesives are typically based on ethylene vinyl acetate. However, such hot melt adhesives generally do not provide an acceptable bond with non-porous surfaces. In addition, materials such as Corian® solid surface with significant thermal mass tend to extract heat from the hot melt adhesive adhesive line and effectively raise the viscosity of the adhesive. This can produce an edgeband seam that is both functionally and aesthetically unsatisfactory.

SUMMARY OF THE INVENTION

The invention relates to a process for applying an edgeband to a structure. The process utilizes a reactive adhesive that is capable of adhering the edgeband to at least one edge of the structure. The process comprises the steps of:

(1) providing a structure having at least one planar edge;

(2) providing an edgeband having at least one edge face;

(3) heating at least one gluing edge to a temperature greater than about 25° C., wherein the gluing edge is selected from the at least planar edge and the at least one edge face;

(4) applying a reactive adhesive to the gluing edge, the adhesive having an adhesive melting point, the adhesive being provided at a temperature greater than the adhesive melting point;

(5) applying the edge face to the at least one planar edge; and (6) holding the edgeband in contact with the planar edge for a time sufficient to form an adhesive bond therebetween.

The invention also relates to an apparatus for applying an edgeband to a non-porous structure. The apparatus comprises:

(a) a movable support;

(b) at least one heater;

(c) at least one sealed adhesive system;

(d) at least one edgeband applicator; and (e) at least one clamping component;

wherein the adhesive system comprises a heated container, a heated conduit and a heated applicator.

The invention itself, together with further objects and attendant advantages, will best be understood by reference to the following detailed description and accompanying drawings.

DETAILED DESCRIPTION OF THE PREFERRED EMBODIMENTS

Figure 1:
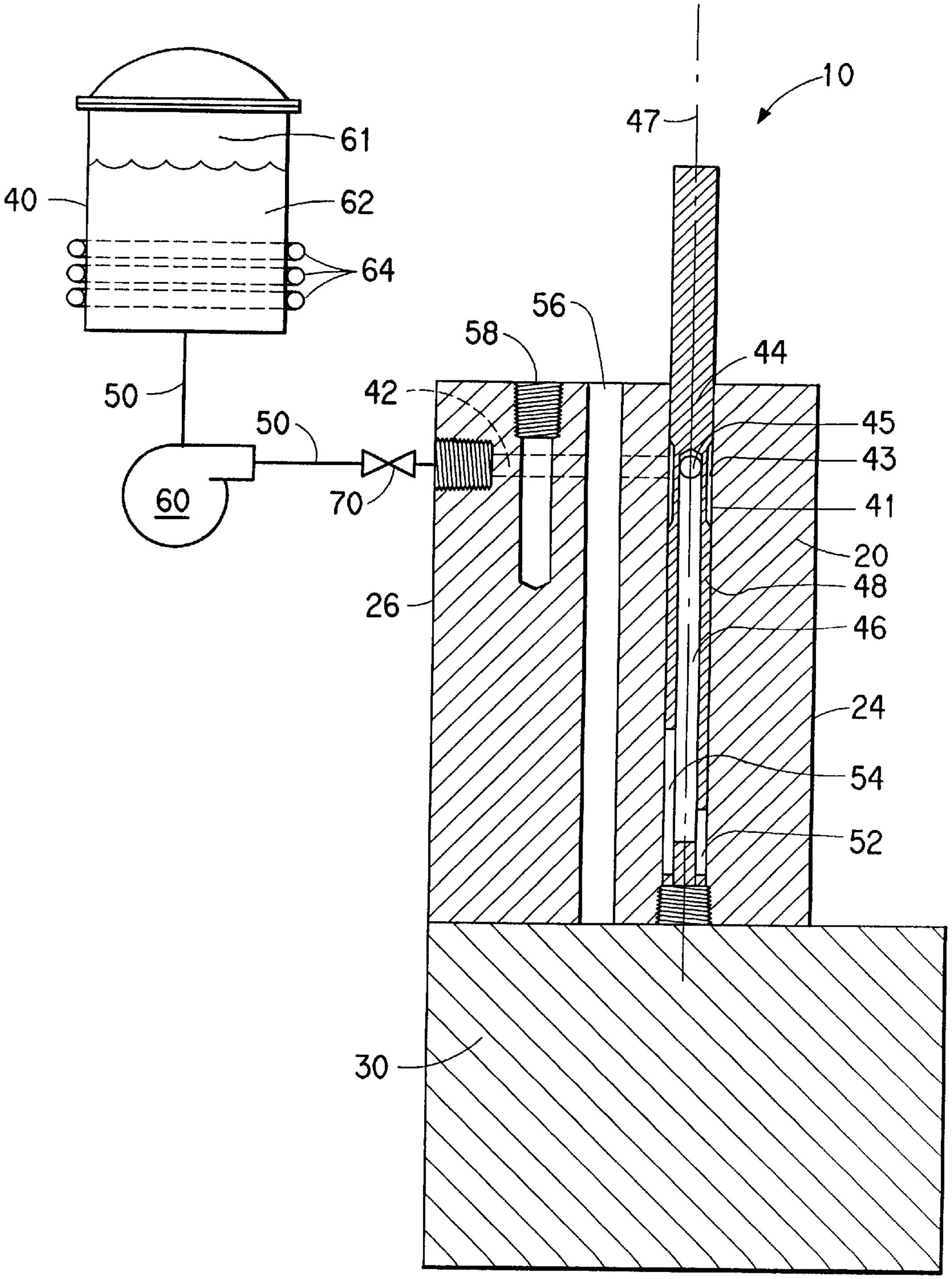
FIG. 1 is a cross-sectional view of an extrusion system of the present invention for applying adhesive.

The present invention relates to a process for applying an edgeband to a structure, such as a panel, to form a composite assembly. The present invention is especially useful where the structure and/or edgeband is made from a non-porous material. The process overcomes the traditional edgebanding deficiencies and results in a joint of exceptional strength and appearance. The problems associated with edgebanding are solved by use of a reactive adhesive that will form a strong bond with an acceptable adhesive line. Rapid bonding of the edgeband strip to the structure allows for immediate machining of the assembly of the composite assembly, and thereby results in higher manufacturing productivity and product performance.

As used herein, the term "non-porous" refers to a material that is substantially free of minute surface openings or channels and substantially lacks the surface peaks and valleys that can create a mechanical lock with conventional hot melt adhesives. Examples of suitable non-porous materials include filled acrylic solid surfacing materials, such as Corian®, products made by E. I. du Pont de Nemours and Company, Inc. (Wilmington, Del.); hard woods, such as mahogany and maple; and plastics, such as polystyrene, thermoset polyesters, and urea and melamine formaldehyde resins.

The structure useful in the present invention should have at least one planar edge. In general, a useful structure has at least two faces and at least one planar edge connecting the at least two faces. Preferably, each of the faces has a surface area that is greater than the surface area of the planar edge. The term "planar" describes a surface having a geometry wherein the intersection of the surface with a plane is either a line or a plane.lt is understood that, while the structure should have at least one planar edge, the structure does not necessary need to include a planar face. An example of a structure having non-planar face is one that has an undulating surface as at least a portion of a face. It is understood that the structure useful in the present invention can be of any shape (so long as it has at least one planar edge) and size. Examples of possible structure shapes include, but are not limited to, parallelpiped, prism, tetrahedron, bisphenoid, pyramid, frustrum, and disc. Generally, the present invention is used with a rectangular or a disc-shaped structure. It is understood that the previous list of illustrative shapes provides no limitations to the configurations of the faces connected to the planar edges.

Optionally, the planar edge can be treated to improve the adhesion to the edgeband. A preferred treatment is a corona discharge treatment. Such corona treatments are well known and involve exposure of the material to a discharge due to the ionization of a gas (usually air) that in turn is due to a potential gradient exceeding a certain critical value. The corona treatment generally is provided for from a few seconds up to a few minutes. The corona treatment is most effective when two surfaces made of similar materials are being joined, particularly when a filled acrylic edgeband is being joined to a filled acrylic structure. It is also possible to treat only the face of the edgeband with a corona discharge, or to treat both the edge face of the edgeband and the planar edge of the structure.

The edgeband is typically a long strip having at least one edge face that is planar. The other surface(s) of the edgeband can be curved or planar. However, it is preferred that the edgeband be a linear strip having two parallel planar edge faces, and two thinner side faces. The dimensions of the edge face that is to be bonded to the panel, are preferably such that the width is at least as large as the width of the planar edge of the structure, and the length is preferably as long as the planar edge is desired to be on the finished structure. Preferably the width of the edge face of the edgeband is slightly larger than the width of the planar edge of the structure; more preferably about 10–50% larger. Frequently the edge face of the edgeband will be in the range of from about one-eighth to about one-fourth inch (0.32 to 0.64 cm) wider than the side edge of the panel. This extra width allows for finishing of the composite assembly by removing the excess edgeband material so that the finished width is exactly the same as that of the structure. The edgeband can be made any material that will adhere to the structure with the chosen adhesive. Examples of suitable materials include, but are not limited to, wood; plastics, such as polyvinyl chloride and filled and unfilled acrylics; and laminates of different materials. The edgeband can have any desired thickness. In general, however, the thickness is less than the width of the edgeband.

The edge to which adhesive is to be applied, the gluing edge, is heated prior to the application of the adhesive. The gluing edge heating temperature is generally above about 25° C., preferably in the range of about 30–50° C. The edge to which the gluing edge is to be joined, the joining edge, should be at about room temperature, generally about 20–25° C.

It should be noted that the gluing edge can be the planar edge of the structure, the edge face of the edgeband, or both. Where the gluing edge is both the planar edge and the edge face of the edgeband, both surfaces are heated to a gluing edge heating temperature. The hot melt adhesive is then applied to the gluing edge. For example, when the gluing edge is the planar edge of the structure, the planar edge should be heated, preferably to about 30–50° C. The edge face of the edgeband can be, in this case, the corresponding joining edge or a second gluing edge. Where the edge face of the edgeband is a joining edge it should be at about room temperature prior to being bonded to the gluing edge. If either part is too cool, the adhesive will solidify too quickly and not adequately wet the two surfaces. On the other hand, if either part is too warm, the adhesive will remain fluid for too long and not form an adhesive bond quickly enough. When higher temperatures are used, a longer time may be required to hold the two pieces together before additional processing can take place. Heating can be accomplished by any conventional means, including for example, resistance heaters, infrared, and hot air blowers.

The adhesive useful in the present invention is a reactive adhesive. While the adhesive can be melted and remelted, once it is allowed to react, the adhesive forms a permanent bond and can only be removed mechanically. In general, the reactions are initiated by exposure to moisture. The moisture in the air is generally sufficient to initiate the reactions, and thus it is preferred that the adhesive be kept removed from the atmosphere prior to use. This can be accomplished by using a closed adhesive container and delivery unit(s) (a "closed system"), or by blanketing the adhesive under a non-reactive gas, such as nitrogen. A preferred system uses a combination approach, wherein the adhesive is stored in a closed adhesive container purged with dry nitrogen.

Suitable reactive adhesives include, for example, polyurethane adhesives Commercially available suitable reactive polyurethane adhesives include for example, adhesives available under the brand Supramelt, Supratac and Supracraft from Klebchemie M. G. Becker GmbH (Weingarten, West Germany); the brand Jetweld available from 3M (St. Paul, Minn); and the brand Jowatherm available from Jowatt Corp. (Anaheim, Calif.). It is understood that the adhesive can be chosen based on the nature of the structure material.

The adhesive can be applied directly onto the gluing edge, without any priming layer. Frequently in known edgebanding processes, a primer must be applied in order to get adequate wetting of the surface with the adhesive. It is surprising that in the process of the invention, no primer is necessary. In applying the adhesive to the panel, the adhesive is first heated to a temperature above its melting point. The temperature should be one at which the viscosity is suitable for application to the gluing edge. This temperature will vary with the specific adhesive used, but generally is in the range of about 75–200° C. The adhesive can be applied using any conventional technique, such as using one or more rollers dipped in a adhesive pot, which is commonly used with edgebanders. As the rollers move, they continually pick up adhesive from the adhesive pot and transfer the adhesive to the edges with which they come in contact. However, because of the reactive nature of adhesive, it is preferred that the application method minimize the exposure of the bulk of the adhesive to the atmosphere.

It is preferred that the adhesive be heated in a sealed container and transferred through a heated conduit to a sealed and heated applicator. The applicator should be adapted to handle the temperature and pressure of the highly viscous adhesive. For example, all the seals and gaskets should be made of a material that will not expand and allow leakage or melt back of the adhesive. A useful material for all such seals is a metal, such as aluminum. The applicator can be, for example, an adhesive gun or an extruder head.

A preferred method of application is a sealed extrusion method. The adhesive is heated in a sealed container, transferred through a heated conduit and extruded through a heated extrusion head onto the gluing edge. The extrusion can be accomplished by any conventional means, such as a screw extruder, a pump, or by air pressure. It is preferred to use a gear pump as it provides a constant volume of adhesive at the gluing edge. The adhesive can be passed from the extrusion head through a die designed to achieve the appropriate configuration for application to the planar edge.

A preferred extrusion system of the present invention is illustrated in the accompanying drawings.

Figure 2:
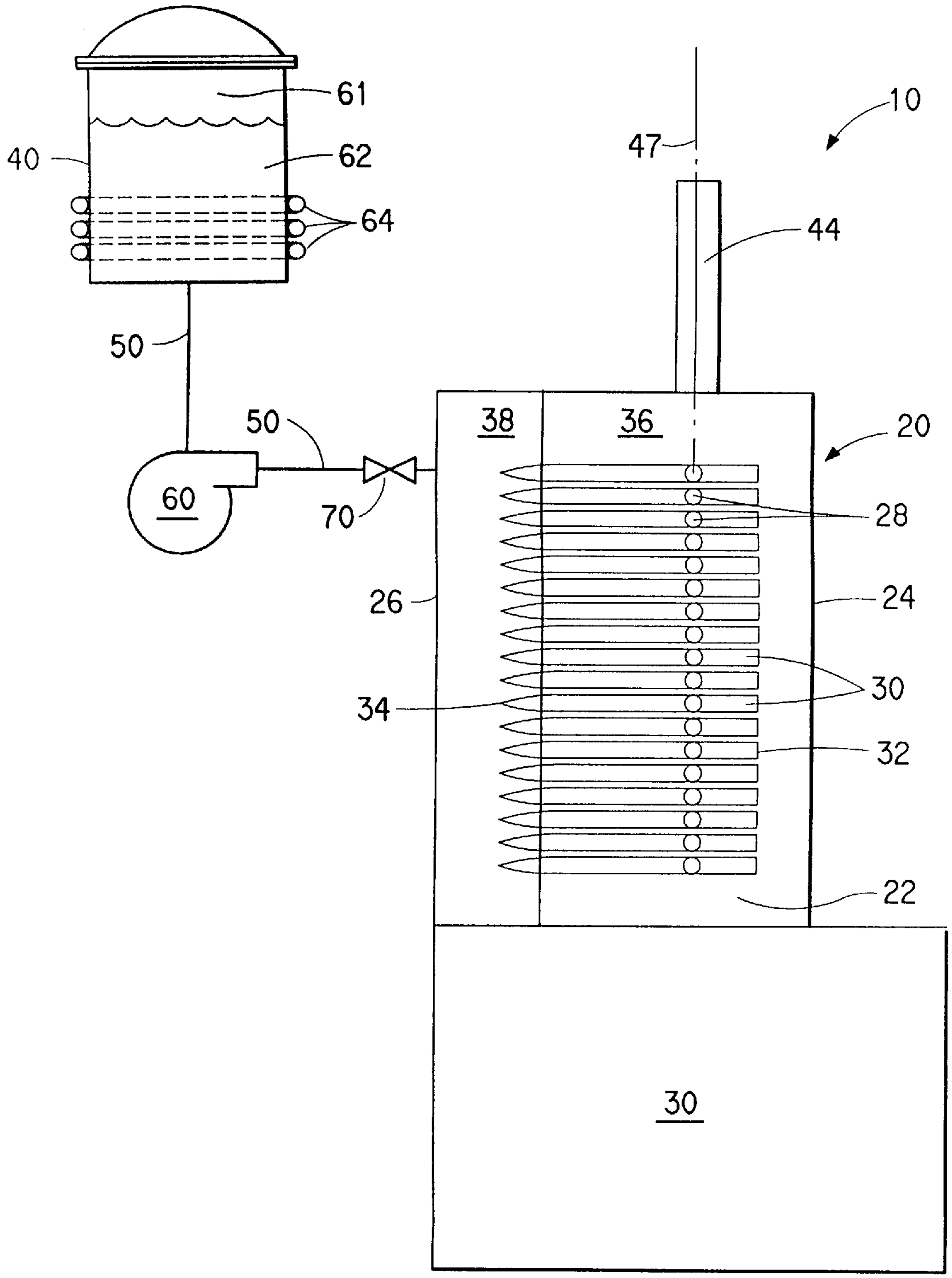
FIG. 2 is a planar view of the extrusion system of FIG. 1.
Figure 3:
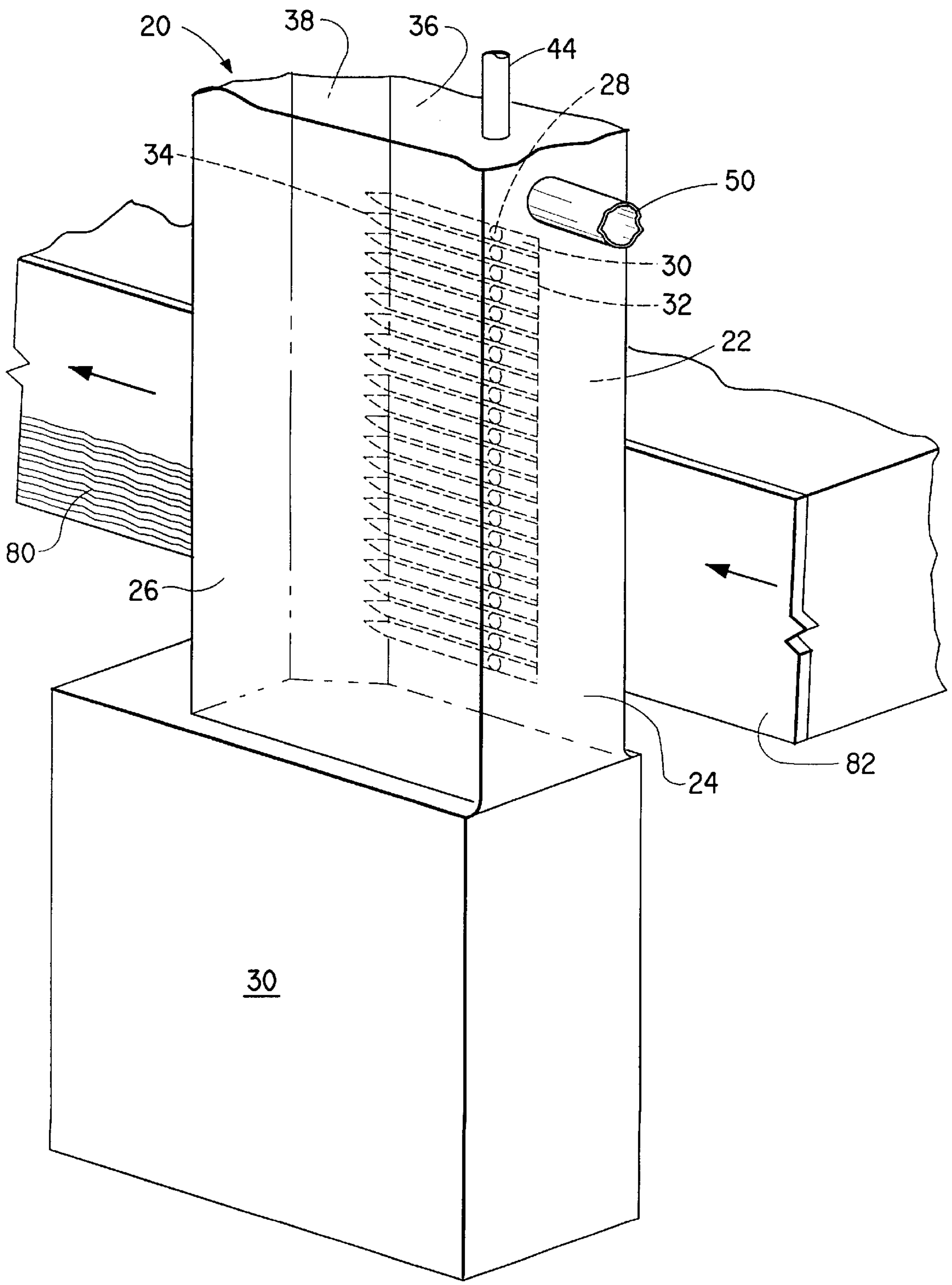
FIG. 3 is a simplified perspective view of the extrusion system of FIG. 1 applying adhesive to a panel.
Figure 4:
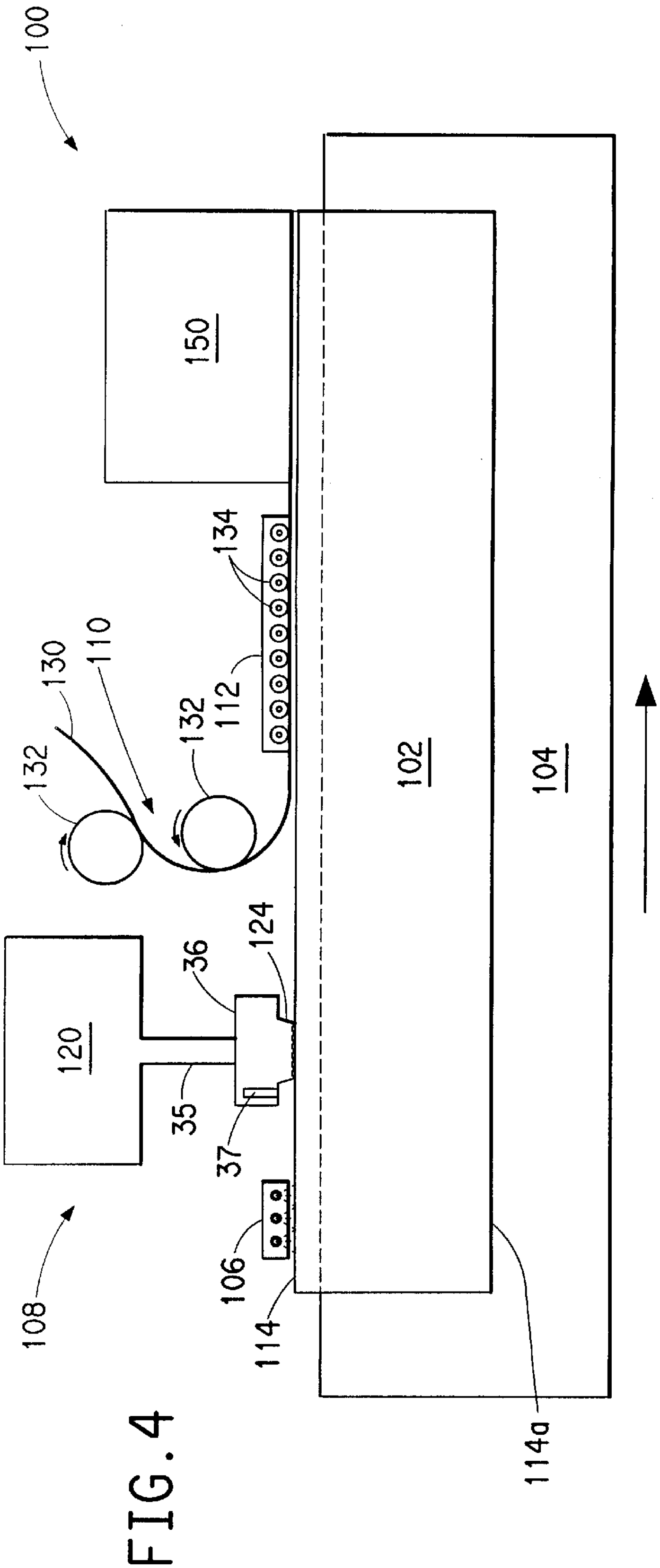
FIG. 4 is a top view of an edgebander apparatus of the present invention.
Figure 5:
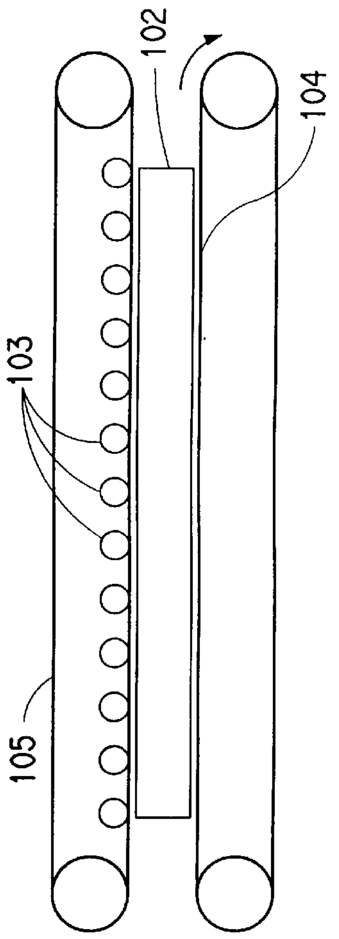
FIG. 5 is a simplified side view of a panel securing means useful in the apparatus of FIG. 4.

As best seen in FIGS. 1 and 2, a preferred extrusion system 10 contains an extrusion head 20 on a mounting fixture 30, which fixture 30 attaches the extrusion head 20 to an edgebander apparatus, such as the one shown in FIGS. 3–5. An adhesive container 40 is connected to the extrusion head 20 by a conduit 50, a pump 60 and optionally a inlet valve 70.

As best seen in FIG. 2, the extrusion head 20 has a die side 22 adjacent to a first side 24, and a second side 26 opposite the first side 24. The die side 22 includes a plurality of die openings 28. Each die opening 28 is connected to a die channel 30. As best seen in FIGS. 2 and 3, each die channel has a lead end 32 adjacent to the first side 24 and a tapered trailing end 34 adjacent to the second side 26.

As best seen in FIGS. 2 and 3, the die side 22 has a first die face 36 adjacent to and essentially perpendicular the first side 24, and a second die face 38 adjacent to the second side 26. The first die face 36 contains the die openings 28 and a large proportion of the die channels 30, including the lead end 32. The second die face 26 is disposed at an angle to the first die face 36 and contains the remaining portion of the die channels 30, including the trailing end 34.

As best seen in FIG. 1, the extrusion head 20 also includes an adhesive inlet passage 42 connected to a rod valve 44, which is rotatable about an axis 47. The rod valve 44 has an open cavity 46 defined by cavity wall 48 that includes a plurality of valve slot openings 52, 54 of varying sizes. The extrusion head 20 further includes a heating element cavity 56 to allow the insertion of a heating element (not shown) into the extrusion head 20, and a thermocouple cavity 58 to allow the insertion of a thermocouple (not shown) into the extrusion head 20.

In operation, an adhesive 62 is housed in the adhesive container 40 that can be a closed system or a semi-batch system. The container 40 may contain air or, preferably a nonreactive gas such as nitrogen in the space 61 above the adhesive. The adhesive is heated in the adhesive container 40 by a heating element 64. The adhesive is heated to a heated adhesive temperature at which the adhesive flows and can be moved through the system 10 and out through the extrusion die. Typcially, the molten adhesive has a consistency similar to that of molasses, with a viscoisty of several hundred centipoise. Preferably, the viscosity is between about 200 and about 800 centipoise. The heated adhesive temperature depends upon the type of adhesive used. In general, the heated adhesive temperature for a polyurethane reactive hot melt adhesive ranges from about 110° C. to about 160° C.

Pump 60 provides the heated adhesive through heated conduit 50 and the optional inlet valve 70 to the extrusion head 20. Although not shown in the drawings, an inert gas tank may be connected to the container 40 to replace to volume of the adhesive pumped to the extrusion head 20. The extrusion head 20 is heated to maintain the elevated temperature of the adhesive. The adhesive inlet passage 42 allows the heated adhesive to flow into a feed channel 43 adjacent to the rod valve 44. The feed channel 43 is connected to a feed opening 45 defined by the cavity wall 48. The feed channel 43 allows the heated adhesive to flow into the feed opening 45 and enter the open cavity 46 of the rod valve 44. In FIG. 1, the feed channel 43 is shown as a continuous recess about the outer circumference of the rod valve. Alternatively, the rod valve may have a uniform outer circumference, and the feed channel (not shown) may be provided as a continuous recess about the inner circumference of the valve cavity wall 41 holding the rod valve 46.

The rod valve 44 is then rotated about its axis 47 so the valve slot opening 52 or 54 of a desired size provides a flow passage (not shown) to at least one die opening 28. The number of die openings 28 through which the adhesive will pass depends upon the size of the valve slot opening 52 or 54 selected to be next to the die side 22. The larger valve slot opening 52 or 54 will result in a wider extruded adhesive coating. Thus, as best seen in FIG. 3, the extrusion head 20 can be used to provide an adhesive coating 80 of a desired width on a gluing edge 82.

As best seen in FIG. 1, the rod valve 44 can be rotated to a position between two openings 52 or 54, so that no opening is next to the die side 22, thereby closing adhesive flow through the extruder head 20. Flow of the adhesive can also be controlled by the optional inlet valve 70, so that the rotatable rod valve 44 may be used only to select the size of the width of the extruded adhesive coating. It is noted that, although only two openings 52, 54 are shown in FIG. 1, the rod valve 44 may have any number of openings of any number of sizes. Typically, the rod valve 44 may have five or six openings (not shown) of different sizes.

The conduit 50 can be a pipe or tubing of any material that is nonreactive with the adhesive at the heated adhesive temperature. The conduit 50 may generally a metal pipe, such as aluminum.

As best seen in FIG. 3, adhesive coating 80 is applied to the gluing edge 82 of a panel 84 by feeding the panel 84 in the direction shown such that gluing edge 82 passes flush with die openings 28. After the adhesive has been applied to the gluing edge, the edgeband is applied to the planar edge of the structure, such that the layer(s) of applied adhesive is (are) between the two edges. The adhesive will be on the edge face of the edgeband, the planar edge of the structure, or both. This step should be carried out as soon as possible after the adhesive is applied in order to get the best seal. It is preferred that this step be carried out within 5 seconds or less after the adhesive is applied.

The edgeband is held in contact with the planar edge of the structure for a time sufficient for the hot melt adhesive to react and form a bond that will hold the two pieces together. In practice, it is desired for this bonding to take place as quickly as possible to increase the rate of production and reduce costs. It is preferred that a bond of sufficient strength to hold the two pieces together is formed in less than about 30 seconds; more preferably, less than about 10 seconds. The edgeband and panel can be held in contact by any conventional means, such as using clamps. In continuous processes, this is frequently accomplished by means of rollers that press against the edgeband and hold it in contact with the panel.

Machines for applying edgebands to planar edges of a structure, or edgebanders, are known and commercially available. An improved edgebander apparatus has been found to be particularly suitable for carrying out the process of the invention. The apparatus comprises (a) a movable support, for conveying the panel; (b) a heating station, for heating the gluing edge; (c) an adhesive applicator station, for applying the adhesive to the gluing edge; (d) an edgeband applicator station, for providing the edgeband in contact with the side edge of the panel; and (e) a clamping station, for holding the edgeband in contact with the side edge of the panel. Optionally, the apparatus may also include a finishing station.

FIG. 4 illustrate one type of edgebanding apparatus 100 of the invention in which the gluing edge is the side edge of the planar material.

For simplicity sake, the apparatus 100 is illustrated with a panel structure 102. The panel structure is generally rectangular in shape having an upper planar surface, a lower planar surface and four edges that are perpendicular to the planar surfaces. The first edge is designated the leading edge. Opposite the leading edge and parallel to it is the trailing edge. The two remaining edges are designated as side edges. These side edges are the planar edges 114, 114*a* of the panel structure. The side edges are parallel to each other and perpendicular to the leading and trailing edges. As defined herein, the edgeband will be applied to a side edge. The shorter dimension of the side edge is referred to as the width; the longer dimension is referred to as the length. As best seen in FIGS. 4 and 5, the apparatus 100 includes a movable support 104 , a heater 106, an adhesive applicator 108, an edgeband applicator 110, and a clamping component 112.

Where the structure has a straight planar edge such as a panel 102, the movable support 104 is typically a conveyor belt. The panel 102 is placed on the support 104 and secured in place so that it cannot move relative to the support 104. This can be accomplished by means of clamps (not shown) or any other conventional securing devices. As best seen in FIG. 5, the panel 102 can also be secured by sandwiching the between two conveyor belts 104, 105. As best seen in FIG. 5, the lower belt 104 is driven, while the upper belt 105 is weighted, for example, by means of rollers 103, and is movable but not necessarily driven.

It is understood that the configuration of the movable support depends upon the shape of the structure. For example, in an alternative embodiment (not shown), where the structure has a planar edge that is not flat, such as the edge of a disc-shaped structure, the movable support can be a circular rotatable platform. The circular platform preferably has a diameter that is no greater than the circumference of the disc-shaped structure. The structure on this circular platform can be transported from one station (for example, heater) to the next (for example, adhesive applicator) by hand or by a conveyor belt. The circular platform can be motorized to rotate and thereby allow the edgebanding station access to various portions of the planar edge.

Panel 102 is positioned on the support 104 such that the planar edge 114 to which the edgeband 130 is to be attached is positioned such that the edge 104 passes the heater 106, adhesive applicator 108, edgeband applicator 110, and clamping component 112, as the support 104 moves.

In the edgebander of FIG. 4 , the planar edge 114 of the panel 102 is heated by heater 106 . Any conventional heater can be used, including resistance heaters, infrared heaters and hot air blowers. The heat is directed such that principally the side edge is heated. Alternatively, if the gluing edge is the edge face of the edgeband, the heater will be positioned such that the edge face of the edgeband passes by it to be heated.

The adhesive is applied to the planar edge 114 through a sealed adhesive applicator system 108. By "sealed" it is meant that the adhesive container 120 that does not allow the adhesive material to chemically react by, for example, preventing the adhesive material to be exposed to the atmosphere, until the adhesive material exits the applicator. This can be accomplished, for example, by using a closed system or by blanketing the system with an inert gas, such as nitrogen. The sealed adhesive applicator system includes a heated container 120, a heated conduit 122, and a heated applicator head 124. The container 120 is generally made from a material that does not react with the heated adhesive, typically a polymer-lined metal. Suitable materials include aluminum or steel containers lined with Impreglon®, made by Impreglon (Fairburn, Ga.) or Teflon®, made by E. I. du Pont de Nemours and Company, Inc. (Wilmington, Del.). It can be heated by any conventional means, such as heating coils in the container or a heating jacket around the container. The heated conduit 122 is generally metal tubing, which can be heated by any conventional means. Applicator head 124 has heating element 126 and orifice 128 through which the adhesive flows onto the gluing edge 114. Preferably, the applicator head 124 is a glue gun, which has been modified to have non-expanding seals and gaskets made of aluminum, or an extruder head. Most preferably, the adhesive applicator system 108 is the extrusion system 10 described in FIGS. 1–3.

Edgeband applicator 110 is generally includes a series of feed rollers 132 through which the edgeband 130 is fed. The edgeband 130 is positioned adjacent to and in contact with the planar edge 114 of the panel 102.

Although the apparatus 108 is shown to provide the planar edge 114 as the gluing edge, it is understood that it apparatus 108 can also apply an adhesive coating onto the edge face (not shown) of the edgeband 130, such that the apparatus 108 provides two gluing edges or provides only the edge face as the gluing edge.

In the alternative embodiment (not shown) where the apparatus applies adhesive coating to both the edge face of the edgeband as well as the planar edge of panel, the edgebanding apparatus includes an additional heater such as one similar to heater 106. This additional heater (not shown) is placed adjacent to edgeband 130 near rollers 132. Furthermore, the edgebanding apparatus in this alternative embodiment includes an additional applicator head (not shown) such as one similar to applicator head 124. This additional applicator head is placed downstream from the additional heater and adjacent to the edgeband 130 to apply an adhesive coating to the edge face (not shown) of the edgeband 130. It is understood that the additional applicator head may be connected to the same adhesive container 120 as the illustrated applicator head 124.

In the alternative embodiment (not shown) where the apparatus only applies an adhesive coating to the edge face of the edgeband, it is understood that heater 106 and applicator head 124 are located adjacent to the edgeband 130 (in the same placement as the before described additional heater and additional applicator head), instead of their illustrated location adjacent to the planar edge of the structure.

The clamping component 112 holds the edgeband 130 and the panel 102 together. This can be done using any conventional means, including clamps (not shown) and rollers 134. In the illustrated clamping component 112, the edgeband 130 and panel 102 are held together by means of a series of rollers 134 the apply pressure in the direction essentially perpendicular to the planar edge 114. The rollers 134 can be spring loaded or air cylinder loaded and preferably apply about 50–150 pound of pressure (3.5–10.5 kg/cm). This holding section, or pressure zone, is longer than that of a conventional edgebander. It is preferred that there be at least 8 rollers providing pressure in this section.

Preferably, there is a finishing zone 150 after the pressure zone. Finishing 150 typically includes removing the leading and trailing edges of the edgeband such that it is the same length as the panel 102; trimming the edgeband such that it is the same width as the side edge of the panel; shaping the edgeband. These steps are well known and can be carried out by means of cutters, saws, and other known devices.

In an application where it is desirable to conceal the seamline formed between an edgeband and a structure, the finishing zone can further include a station where a laminate material can be provided on the upper and/or lower planar surface(s) of the panel.

It is understood that, while the illustrated apparatus 108 has the capability to apply an edgeband to one planar edge at a time, the present invention also relates those apparatus that has the capability to apply edgeband to two planar edges at one time. In this third embodiment (not shown), the apparatus includes a second set of the illustrated heater 106, adhesive applicator 108, edgeband applicator 110 and clamping component 112. This second set is placed on the planar edge 114*a* opposite the planar edge 114. In this embodiment the two-belt system illustrated in FIG. 5 is especially useful in securing the structure during processing.

The Examples below further illustrates certain features of the present invention.

EXAMPLES

The following examples are illustrative of the invention but not limiting.

The adhesives were tested by gluing a sample of Corian® filled acrylic solid surface material (dimension: 1×1 inch (2.54×2.54 cm)) to the surface of another sample of Corian® solid surface (dimension: 3×3 inch (7.62×7.62 cm)). The strength of the adhesive bond was then tested by subjecting the composite sample to a shearing stress. The test was performed in accordance with ASTM D-4501-91:

| Adhesive | Compression-Shear, psi ($kg/cm^2$) |
|---|---|
| Jowatherm 220 | 350 (24.5) |
| Supramelt PU 704.2 | 1241 (86.9) |
| Supramelt PU 703.5 | 1319 (92.3) |
| Supramelt PU 704 | 932 (65.2) |
| Jetweld TE031 | 940 (65.8) |
| Jetweld TS230 | 640 (44.8) |

A bond strength of at least 300 psi (21 $kg/cm^2$) is generally acceptable. Use of conventional hot melt adhesives such as ethylene vinyl acetate typically have bond strengths less than 200 psi (14 $kg/cm^2$).

Of course, it should be understood that a wide range of changes and modifications can be made to the preferred embodiment described above. It therefore is intended that the foregoing detailed description be regarded as illustrative rather than limiting and that it be understood that it is the following Claims, including all equivalents, which are intended to define the scope of this invention.

What is claimed is:

1. An apparatus for applying an edgeband having at least one edge face, to a structure having at least one planar edge, said apparatus comprising:

(a) at least one movable support;

(b) at least one heater for heating the edgeband or the structure;

(c) at least one sealed adhesive system;

(d) at least one edgeband applicator; and (e) at least one clamping component;

wherein the adhesive system comprises at least one heated adhesive container, at least one heated conduit and at least one heated applicator.

2. The apparatus of claim 1 wherein the edgeband applicator comprises an extruder head comprising:

(a) a heating element;

(b) an adhesive inlet;

(c) an extrusion die having multiple openings;

(d) a rotatable rod valve comprising a rod having an open cavity with at least two openings of different sizes, said rod being positioned such that upon rotation, each of the at least two openings in the cavity of the rod is adjacent to the openings in the extrusion die.

3. The apparatus of claim 2, further comprising a valve at the adhesive inlet to control the flow of adhesive.

4. The apparatus of claim 1, wherein the extrusion system applies an adhesive coating to at least one planar edge of the structure.

5. The apparatus of claim 1, wehrein the extrusion system applies an adhesive coating to an edge face of the edgeband.

6. An extruder head comprising:

(a) a heating element;

(b) an adhesive inlet;

(c) an extrusion die having multiple openings;

(d) a rotatable rod valve comprising a rod having an open cavity with at least two openings of different sizes, said rod being positioned such that upon rotation, each of the at least two openings in the cavity of the rod is adjacent to the openings in the extrusion die.

* * * * *